United States Patent
Jalal et al.

(10) Patent No.: US 12,430,032 B2
(45) Date of Patent: Sep. 30, 2025

(54) APPARATUS AND METHOD FOR HANDLING MEMORY ACCESS REQUESTS

(71) Applicant: Arm Limited, Cambridge (GB)

(72) Inventors: Jamshed Jalal, Austin, TX (US);
Gurunath Ramagiri, Austin, TX (US);
Tushar P Ringe, Austin, TX (US);
Mark David Werkheiser, Austin, TX (US); Ashok Kumar Tummala, Austin, TX (US); Dimitrios Kaseridis, Austin, TX (US)

(73) Assignee: Arm Limited, Cambridge (GB)

( * ) Notice: Subject to any disclaimer, the term of this patent is extended or adjusted under 35 U.S.C. 154(b) by 321 days.

(21) Appl. No.: 18/000,761

(22) PCT Filed: May 20, 2021

(86) PCT No.: PCT/GB2021/051223
§ 371 (c)(1),
(2) Date: Dec. 5, 2022

(87) PCT Pub. No.: WO2021/250371
PCT Pub. Date: Dec. 16, 2021

(65) Prior Publication Data
US 2023/0221866 A1     Jul. 13, 2023

(30) Foreign Application Priority Data
Jun. 10, 2020   (EP) .................... 20386030

(51) Int. Cl.
*G06F 3/06*     (2006.01)
(52) U.S. Cl.
CPC .......... *G06F 3/0613* (2013.01); *G06F 3/0653* (2013.01); *G06F 3/0659* (2013.01); *G06F 3/0673* (2013.01)

(58) Field of Classification Search
CPC .... G06F 3/0613; G06F 3/0653; G06F 3/0659; G06F 3/0673
See application file for complete search history.

(56) References Cited

U.S. PATENT DOCUMENTS 7,107,386 B1    9/2006  Purcell et al.
10,089,145 B1*  10/2018 Priescu ............... G06F 3/067
(Continued)

FOREIGN PATENT DOCUMENTS

WO   2019/125564 A1   6/2019
WO   2020/180934      9/2020

OTHER PUBLICATIONS

Hernández-Ramos, José L., et al. "Distributed capability-based access control for the internet of things." Journal of Internet Services and Information Security (JISIS) 3.3/4 (2013): 1-16. (Year: 2013).*

(Continued)

*Primary Examiner* — Nicholas J Simonetti
(74) *Attorney, Agent, or Firm* — NIXON & VANDERHYE P.C.

(57) ABSTRACT

A technique for handling memory access requests is described. An apparatus has an interconnect for coupling a plurality of requester elements with a plurality of slave elements. The requester elements are arranged to issue memory access requests for processing by the slave elements. An intermediate element within the interconnect acts as a point of serialisation to order the memory access requests issued by requester elements via the intermediate element. The intermediate element has tracking circuitry for tracking handling of the memory access requests accepted by the intermediate element. Further, request acceptance management circuitry is provided to identify a target slave element amongst the plurality of slave elements for that given memory access request, and to determine whether the (Continued)

given memory access request is to be accepted by the intermediate element dependent on an indication of bandwidth capability for the target slave element.

12 Claims, 9 Drawing Sheets

(56) References Cited

U.S. PATENT DOCUMENTS

| | | | |
|---|---|---|---|
| 2009/0248917 A1* | 10/2009 | Kalos | G06F 3/0671 |
| | | | 710/39 |
| 2014/0115265 A1 | 4/2014 | Chirca et al. | |
| 2014/0279905 A1* | 9/2014 | Muniswamy-Reddy | |
| | | | G06F 3/0683 |
| | | | 707/639 |
| 2017/0132161 A1* | 5/2017 | Hu | G06F 3/0613 |
| 2018/0356992 A1* | 12/2018 | Lamberts | G06F 3/068 |
| 2019/0347011 A1* | 11/2019 | Mathewson | G06F 9/4401 |
| 2020/0081652 A1* | 3/2020 | Nukala | G06F 3/0659 |
| 2021/0279187 A1* | 9/2021 | Puder | G06F 13/1668 |

OTHER PUBLICATIONS

Pacheco, Filipe de Faria. "Intermediate-level protocols to provide quality of service in master/slave communication infrastructures." (2009). (Year: 2009).*

Office Action for GB Application No. 2215785.3 dated Jul. 2, 2025, 5 pages.

* cited by examiner

USE OF CBUSY SIGNALS

DETERMINING WHETHER TO ACCEPT MEMORY ACCESS REQUEST

SYSTEM ADDRESS MAP FOR EACH REQUESTER ELEMENT

| ADDRESS RANGE | TARGET ID FOR COMPLETER ELEMENT TO BE USED FOR ACCESS TO ADDRESS RANGE | MEMORY TYPE /ASSOCIATED QoS |
|---|---|---|
| | | |
| | | |
| ⋮ | ⋮ | ⋮ |
| | | |

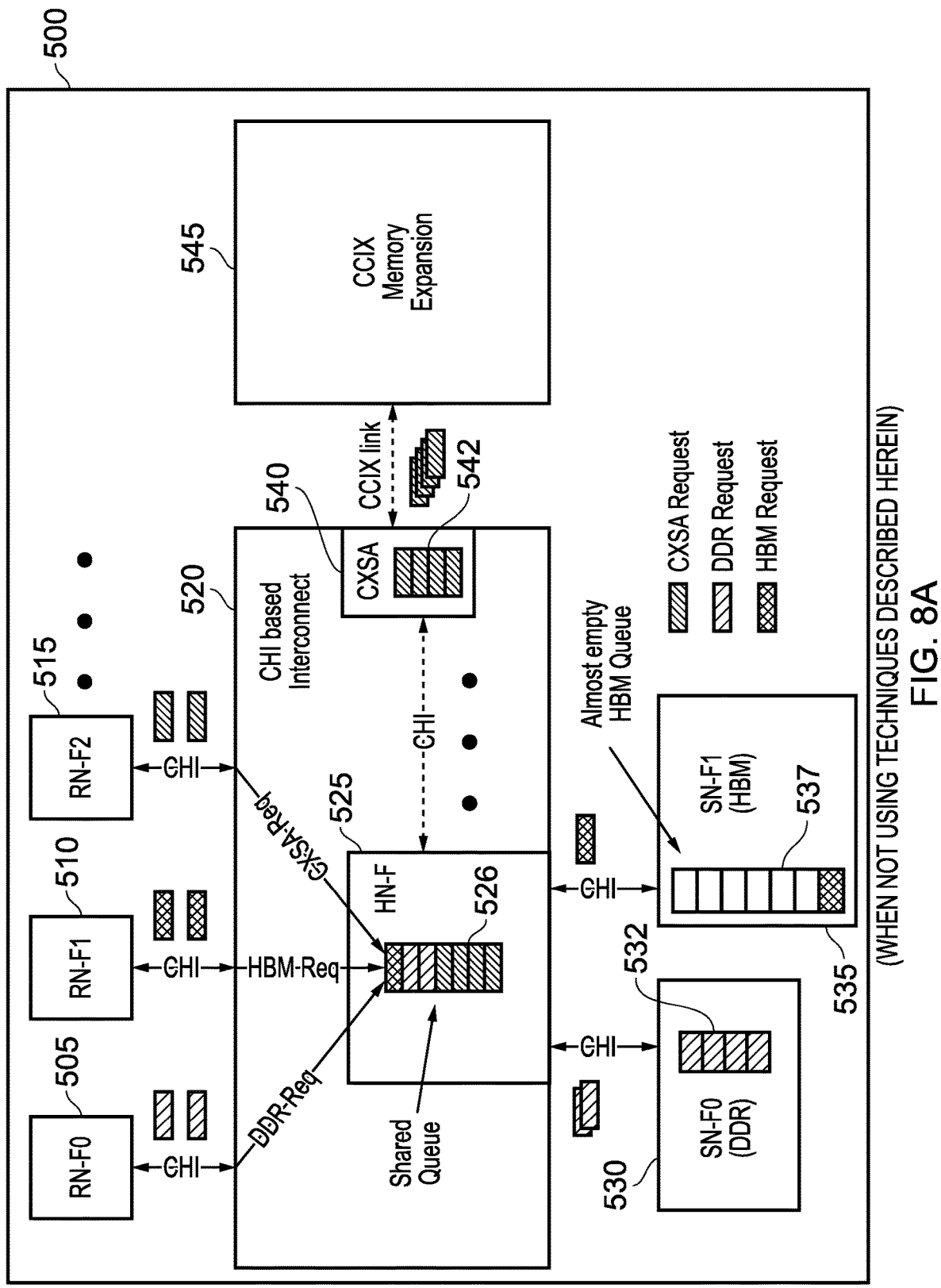
FIG. 8A (WHEN NOT USING TECHNIQUES DESCRIBED HEREIN)

APPARATUS AND METHOD FOR HANDLING MEMORY ACCESS REQUESTS

BACKGROUND

The present technique relates to an apparatus and method for handling memory access requests, and in particular to a technique for handling such memory access requests within an interconnect provided by the apparatus.

An interconnect may be used to couple a plurality of requester elements with a plurality of slave elements. The requester elements may be arranged to issue memory access requests, and a memory access request may cause a slave element targeted by that memory access request to be accessed (for example either to write data to the slave element or a memory device associated with that slave element, or to read data from that slave element, or from a memory device associated with that slave element).

An intermediate element may be provided within the interconnect for coordinating the processing of the various memory access requests issued by the requester elements. The intermediate element may be arranged to keep track of the pending memory access requests that it is coordinating the processing of, but there will typically be a finite limit on the number of pending memory access requests that can be tracked by the intermediate element at any point in time. Once that limit is reached, the intermediate element may have to refuse to accept any further memory access requests issued by the plurality of requester elements until some of those pending memory access requests that it is already keeping track of have been completed.

It has been found that such an approach can limit system performance, for instance in situations where one slave element may be able to handle memory access requests faster than another slave element, for example due to the differing bandwidth capabilities of their associated memory devices. It would be desirable to provide a technique which could enable an increase in system performance in such situations.

SUMMARY

In one example arrangement, there is provided an apparatus comprising: an interconnect to couple a plurality of requester elements with a plurality of slave elements, the plurality of requester elements being arranged to issue memory access requests for processing by the plurality of slave elements; and an intermediate element provided within the interconnect to act as a point of serialisation to order the memory access requests issued by the plurality of requester elements via the intermediate element; the intermediate element comprising tracking circuitry to track handling of the memory access requests accepted by the intermediate element; the intermediate element further comprising request acceptance management circuitry that, in response to receipt by the intermediate element of a given memory access request, is arranged to identify a target slave element amongst the plurality of slave elements for that given memory access request, and to determine whether the given memory access request is to be accepted by the intermediate element dependent on an indication of bandwidth capability for the target slave element.

In another example arrangement, there is provided a method of handling memory access requests comprising: providing an interconnect to couple a plurality of requester elements with a plurality of slave elements, the plurality of requester elements being arranged to issue the memory access requests for processing by the plurality of slave elements; employing an intermediate element provided within the interconnect to act as a point of serialisation to order the memory access requests issued by the plurality of requester elements via the intermediate element; tracking, within tracking circuitry of the intermediate element, handling of the memory access requests accepted by the intermediate element; and in response to receipt by the intermediate element of a given memory access request, identifying a target slave element amongst the plurality of slave elements for that given memory access request, and determining whether the given memory access request is to be accepted by the intermediate element dependent on an indication of bandwidth capability for the target slave element.

In a still further example arrangement, there is provided an apparatus comprising: interconnect means for coupling a plurality of requester elements with a plurality of slave elements, the plurality of requester elements being arranged to issue memory access requests for processing by the plurality of slave elements; and intermediate element means provided within the interconnect means for acting as a point of serialisation to order the memory access requests issued by the plurality of requester elements via the intermediate element means; the intermediate element means comprising tracking means for tracking handling of the memory access requests accepted by the intermediate element means; the intermediate element means further comprising request acceptance management means for identifying, in response to receipt by the intermediate element means of a given memory access request, a target slave element amongst the plurality of slave elements for that given memory access request, and for determining whether the given memory access request is to be accepted by the intermediate element means dependent on an indication of bandwidth capability for the target slave element.

BRIEF DESCRIPTION OF THE DRAWINGS

The present technique will be described further, by way of illustration only, with reference to examples thereof as illustrated in the accompanying drawings, in which:

FIG. 8A illustrates, by way of specific example, how the shared tracking structure within an intermediate element may limit overall system bandwidth when the techniques described herein are not used.

DESCRIPTION OF EXAMPLES

Figure 1:
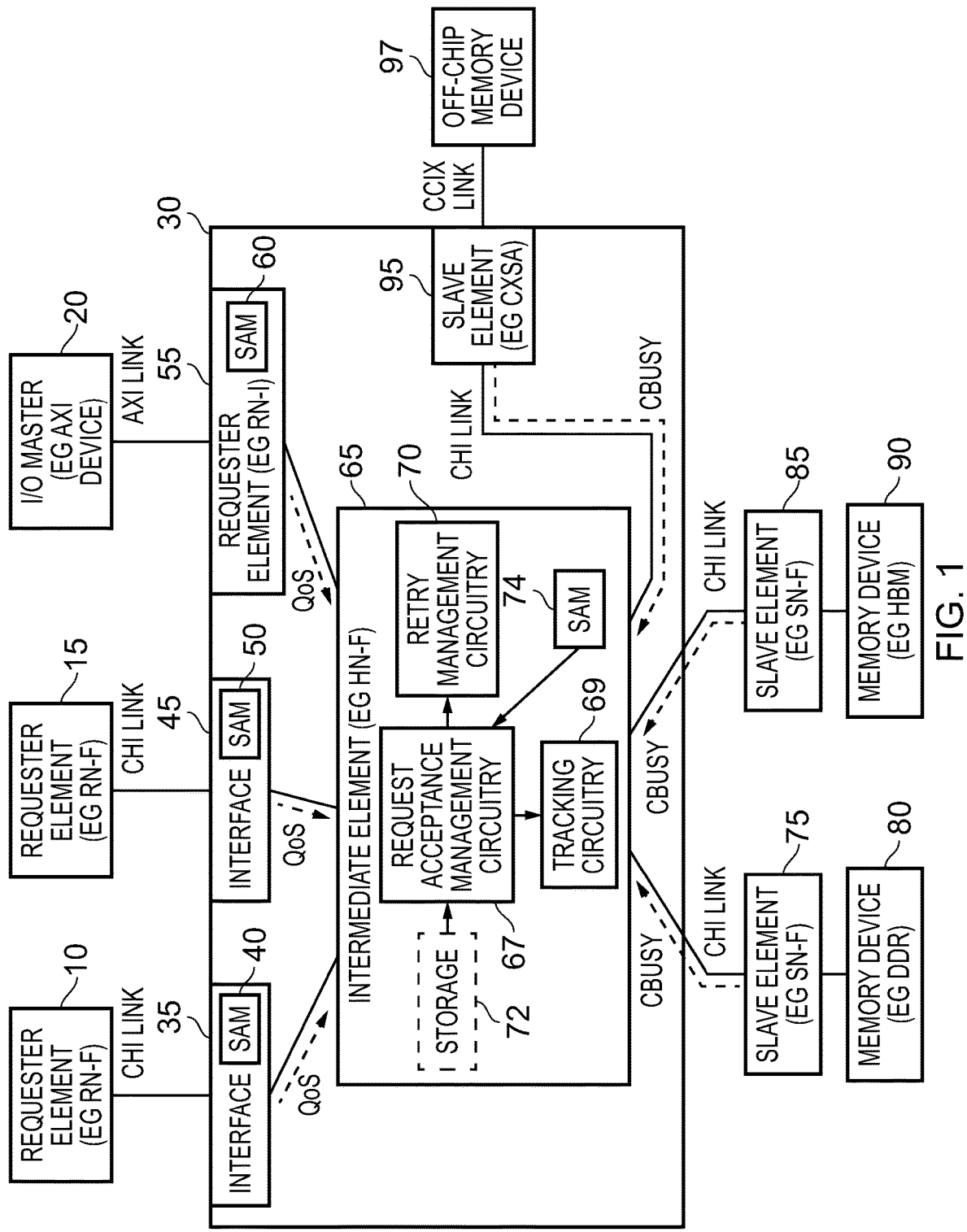
FIG. 1 is a block diagram of a system in accordance with one example arrangement.

In accordance with one example implementation, an apparatus is provided that has an interconnect for coupling a plurality of requester elements with a plurality of slave elements. The plurality of the requester elements are arranged to issue memory access requests for processing by the plurality of slave elements. An intermediate element is provided within the interconnect for acting as a point of serialisation to order the memory access requests issued by the plurality of requester elements via the intermediate element. Hence, the intermediate element can act as a point within the interconnect where the ordering between memory access requests from different requester elements is determined. In some instances, the memory access requests (also referred to herein simply as access requests) may specify addresses within cacheable regions of memory, and one or more of the requester elements may have a local cache. In such instances, the intermediate element can additionally act as a point of coherence, applying a cache coherency protocol in order to ensure that each of the requester elements sees the most up to date version of the data being accessed in response to its access requests.

The intermediate element comprises tracking circuitry to track handling of the memory access requests accepted by the intermediate element. The intermediate element can hence keep track of each accepted memory access request whilst that memory access request is pending within the system. Once a slave element has performed the read operation or the write operation specified by the memory access request (or at least confirmed that that write operation will be performed), or the intermediate element has directly handled the access request without needing to contact the slave element, then the intermediate element may be arranged to stop tracking the associated memory access request, freeing up space to track another memory access request. In some implementations, any required acknowledgement may need to be returned to the requester element (along with the read data for a read memory access request) before the intermediate element stops tracking the memory access request.

The tracking circuitry within the intermediate element will be of a finite size, and hence there will be a limit on the total number of pending memory access requests that can be tracked by the intermediate element at any point in time. It is hence possible that at the time a new memory access request is received by the intermediate element, it may not have the resources available to track that new memory access request, and in that case may need to signal to the requester element issuing that memory access request that that memory access request cannot be accepted at the current time. This may, for example, cause the requester element to perform a retry of the memory access request in due course.

However, such an approach can in some situations result in some of the available system bandwidth being underutilised. For example, it may be that the various slave elements have different capabilities, and in particular certain slave elements may be able to process memory access requests quicker than other slave elements, for example due to the bandwidth capabilities of the associated memory devices. Hence, in that situation, it may be that a memory access request that is targeting one of the faster slave elements may be rejected by the intermediate element, even though that faster slave element has the capacity to receive that new memory access request and process it. In accordance with the techniques described herein, a mechanism is employed that seeks to reduce the chance of such situations arising.

In particular, in accordance with the techniques described herein, the intermediate element further comprises request acceptance management circuitry that, in response to receipt by the intermediate element of a given memory access request, is arranged to identify a target slave element amongst the plurality of slave elements for that given memory access request. Furthermore, the request acceptance management circuitry then determines whether the given memory access request is to be accepted by the intermediate element dependent on an indication of bandwidth capability for the target slave element.

By such an approach, the criteria used to decide whether to accept a newly received memory access request can be varied dependent on the target slave element for that memory access request, and in particular taking into account information that can be used to indicate the bandwidth capability of that target slave element. Such an approach can be used, for example, to throttle the extent to which tracking circuitry resources can be used to track memory access requests targeting slower slave elements, so as to seek to retain available space within the tracking circuitry for memory access requests targeting faster slave elements. By such an approach, situations can arise where a newly received memory access request may be accepted by the intermediate element if it is targeting one slave element, whilst if that memory access request had been targeting a different slave element that memory access request may have been rejected. It has been found that such an approach can result in a much more efficient utilisation of the overall system bandwidth.

In situations where it is determined that the given memory access request is not to be accepted by the intermediate element, there are a number of ways in which that situation can be handled. In one example implementation the apparatus further comprises retry management circuitry arranged, when the request acceptance management circuitry indicates that the given memory access request is not to be accepted, to communicate with the requester element that issued the given memory access request in order to implement a retry mechanism for the given memory access request. The retry mechanism can take a variety of forms. For example, upon being notified by the retry management circuitry that the given memory access request is not being accepted, the relevant requester element may be arranged to periodically retry the memory access request, or to perform some polling operation in order to seek to determine when the intermediate element will have capacity in its tracking circuitry to receive the memory access request. As another example approach, the requester element may wait until the intermediate element in due course provides a static grant signal which effectively guarantees to the requester element that a space will be provided in the intermediate element's tracking circuitry resources for the given memory access request, at which point the requester element will then reissue the memory access request.

In one example implementation, a similar retry mechanism can also be employed between the intermediate element and the various slave elements, and accordingly if a slave element is unable to accept a memory access request propagated on to it by the intermediate element, a retry signal may be issued from the slave element back to the intermediate element to cause the intermediate element in due course to retry propagation of the memory access request to the slave element.

The bandwidth capability of each target slave element can be identified in a variety of ways. In one example implementation each slave element has an associated memory device, and the bandwidth capability for that target slave element may be dependent on the associated memory device. For example, the bandwidth capability for the target slave element may be dependent on a memory type of the associated memory device. In particular, different types of memory may have different access speeds, and this will affect the speed at which memory access requests can be processed by the associated target slave element.

There are a number of ways in which the request acceptance management circuitry may be arranged to determine an indication of bandwidth capability for the target slave element. However, in one example implementation the request acceptance management circuitry derives the indication of bandwidth capability for the target slave element with reference to at least one information source.

The information source can take a variety of forms, and indeed multiple different information sources may be referred to by the request acceptance management circuitry when seeking to derive the indication of bandwidth capability for the target slave element.

In one example implementation the at least one information source comprises information signals received by the intermediate element from the plurality of slave elements, and the request acceptance management circuitry is arranged to use the information signals to derive the indication of bandwidth capability for each of the slave elements. Hence, in accordance with such an approach, information provided on an ongoing basis by the slave elements may be used to maintain an indication of bandwidth capability for each slave element, hence enabling a dynamic adjustment of the bandwidth capability indications to be made based on information received by the slave elements during use.

The information signals can take a variety of forms, but in one example implementation comprise busyness signals issued by each slave element to identify a level of busyness of that slave element. Hence, in accordance with such an implementation, the actual level of busyness of a slave element can be used to influence whether further memory access requests targeting that slave element are to be accepted by the intermediate element or not. This allows, for example, new memory access requests targeting that slave element to be accepted whilst that slave element is not too busy, but to prevent acceptance of new memory access requests targeting that slave element when it is known that a level of busyness of that slave element is above some threshold level.

In one example implementation the tracking circuitry may have a plurality of entries for tracking memory access requests, and the request acceptance management circuitry may be arranged to determine that the given memory access request is to be accepted by the intermediate element when there is a free entry amongst the plurality of entries, and the indication of bandwidth capability for the target slave element indicates that the target slave element is operating at below a given threshold level of busyness.

Whilst a single threshold level can be used for each target slave element, in an alternative implementation multiple thresholds could be used if desired, so as to allow a more gradated approach to be used between the point at which all memory access requests to a particular target slave element are accepted and the point at which all memory access requests to that target slave element are temporarily rejected.

There are a number of ways in which the request acceptance management circuitry can keep track of the information signals received by the slave elements. In one example implementation the apparatus has storage to maintain the indication of bandwidth capability for each of the slave elements, and the request acceptance management circuitry is arranged to maintain within the storage the indication of bandwidth capability for each of the slave elements dependent on the received information signals. Hence, the request acceptance management circuitry can update the contents of the storage based on information signals as and when they are received from each of the slave elements.

Whilst in one example implementation the request acceptance management circuitry may be arranged to just make use of the most recent information signal received from each slave element, in an alternative implementation the request acceptance management circuitry may be arranged to maintain the indication of bandwidth capability for each slave element in dependence on the information signals received from that slave element over a preceding chosen period of time. By such an approach, an averaging of the busyness of each slave element can be performed based on the information signals received over a period of time.

As an alternative to, or in addition to, using the information signals received from the slave elements, the at least one information source may comprise a quality of service indication received by the intermediate element in association with the given memory access request. In accordance with such an approach, the various requester elements can attach quality of service indication information to each issued memory access request, with that quality of service indication being used to influence the decision taken by the request acceptance management circuitry as to whether any particular memory access request should be accepted or not.

As discussed earlier, the tracking circuitry may have a plurality of entries for tracking memory access requests. For each quality of service indication, an associated threshold may be defined identifying a number of entries within the tracking circuitry that are able to be used simultaneously to track memory access requests with that quality of service indication. The request acceptance management circuitry may then be arranged to determine that the given memory access request is to be rejected when, taking into account the associated threshold for the quality of service indication of that given memory access request, there are no available entries within the tracking circuitry. Hence, purely by way of illustrative example, if for a particular received memory access request that memory access request has an associated quality of service indication for which it is determined that at most 50% of the entries can be used to track memory access requests having that quality of service indication, then that memory access request may be rejected if it is already the case that 50% of the entries are being used to track memory access requests with that quality of service indication, even though there may still be free entries available within the tracking circuitry. Such an approach can, for example, be used to ensure that space is retained within the tracking circuitry to track memory access requests subsequently received that may have a higher quality of service requirement.

There are a number of ways in which the quality of service indication may be determined. For example, address mapping circuitry may be provided in association with each requester element to convert the memory address specified by a memory access request issued by that requester element into a target identifier used to route the memory access request through the interconnect. That target identifier may, for example, identify the intermediate element to which the memory access request is to be routed when that memory access request is specifying a memory address within the memory address space allocated to one of the earlier-mentioned slave elements. The address mapping circuitry may be arranged to provide memory type information for different memory address ranges, for example to identify the type of memory device being used for those different memory address ranges, which in turn may provide an indication of access speed. The quality of service indication may then be determined based on the memory type information for the memory address range including the memory address specified by the memory access request. The quality of service indication information may be encoded directly within the address mapping circuitry, or alternatively it may be derived based on the memory type information extracted from the address mapping circuitry.

As an alternative to, or in addition to the information signals and quality of service indications discussed earlier, the at least one information source may comprise at least one slave element attribute determined by the intermediate element. Such a slave element attribute may be determined in a variety of ways. For example, address mapping circuitry may be associated with the intermediate element, which is used to determine the target slave element for each received memory access request. The address mapping circuitry may further provide the at least one slave element attribute for each slave element, and accordingly such slave element attributes can be retrieved from the address mapping circuitry by the intermediate element when determining the target slave element for a received memory access request.

The at least one slave element attribute may take a variety of forms, but in one example implementation comprises a bandwidth indicating value for the slave element. In one particular example implementation, this bandwidth indicating value may be a static value, which can hence be predetermined and then referred to during use of the apparatus. The bandwidth indicating value can take a variety of forms, but in one example is dependent on a memory type of the memory device associated with the slave element. The bandwidth indicating value can hence, for example, take into account information such as access speed of that memory device, which may be dependent on the particular type of memory used.

When using such a bandwidth indicating value, then for each such bandwidth indicating value an associated threshold may be defined identifying a number of entries within the tracking circuitry that are able to be used simultaneously to track memory access requests whose target slave element has that bandwidth indicating value. The request acceptance management circuitry may then be arranged to determine that the given memory access request is to be rejected when, taking into account the associated threshold for the bandwidth indicating value of the target slave element for that given memory access request, there are no available entries within the tracking circuitry. Hence, by way of example, the associated threshold can be set higher for memory access requests targeting relatively fast slave elements, and can be set lower for memory access requests targeting relatively slow slave elements. This enables the extent to which the tracking circuitry resources of the intermediate element can be utilised to track memory access requests to relatively slow memory to be contained, so as to seek to retain available space to receive new memory access requests targeting faster memory. Such an approach can increase the overall system bandwidth utilisation.

Particular examples will now be described with reference to the Figures.

FIG. 1 is a block diagram of a system in accordance with one example implementation. The apparatus includes a plurality of requester elements 10, 15, 55 that are coupled via an interconnect 30 to a plurality of slave elements 75, 85, 95. Whilst the slave elements can take a variety of forms, for the purposes of the discussion herein slave elements that are used to access different memory devices are considered. Hence, the slave element 75 may be connected to a memory device 80, which in this example may take the form of Dual Data Rate (DDR) memory, whilst slave element 85 is connected to a further memory device 90, which may for example take the form of High Bandwidth Memory (HBM). As another example, the slave element 95 may be arranged to provide a link to off-chip memory 97 (for example using a CCIX link, which is a high performance, low latency, chip-to-chip interface), and the off-chip memory may be implemented by a yet further type of memory device. When using a CCIX link, the slave element 95 may be referred to as a CXSA element.

Within the interconnect 30 a number of intermediate elements may be provided that can be used to act as points of serialisation to order access requests issued by requester elements. In the example shown in FIG. 1, the intermediate element 65 is provided as a point of serialisation for access requests issued from any of the requester elements 10, 15, 55 which target the slave elements 75, 85, 95. Herein, an intermediate element such as the intermediate element 65 may also be referred to as a home node.

The interconnect 30 provides communication channels for supporting communication between each of the requester elements and the various home nodes, and for supporting communication between the home nodes and associated slave elements.

In the example shown in FIG. 1, two types of requester element are shown, referred to herein as fully coherent requesters 10, 15, and an input/output (I/O) coherent requester 55. A fully coherent requester such as the element 10 or the element 15 shown in FIG. 1 may have an associated local, hardware-coherent, cache, and may be arranged to connect to the interconnect via an associated interface 35, 45.

Access requests issued by any of the requester elements 10, 15, 55 that relate to cacheable memory addresses will be routed via a fully coherent home node, and in the example of FIG. 1 it is assumed that the intermediate element 65 is indeed a fully coherent home node. A fully coherent home node will act not only as a point of serialisation for access requests, but will also act as a point of coherence, and as such may implement a cache coherency protocol in order to ensure that a requester issuing an access request pertaining to a cacheable memory address will see the most up-to-date version of the data. Typically, such a coherent home node will include snoop control circuitry for seeking to track which local caches have cached data within particular address regions, to thereby work out which local caches need to subjected to snoop operations in order to implement the cache coherency protocol.

In contrast to fully coherent requester elements 10, 15, I/O coherent requester elements such as element 55 do not include a hardware-coherent cache, and do not require associated snoop functionality to respond to snoop requests.

Whilst not shown in FIG. 1, the interconnect 30 may include non-coherent home nodes that do not provide a point of coherence, and are not capable of processing snoopable requests. These may for example be used when accessing non-cacheable regions of memory, or peripheral or device memory.

The system may also include two different types of slave elements, namely slave elements that may be coupled to fully coherent home nodes and slave elements that may be coupled to non-coherent home nodes. In the example shown herein, the home node 65 is a fully coherent home node and hence the slave elements 75, 85, 95 are of the type used to connect to a fully coherent home node. However, the techniques described herein could also be applied in relation to a non-coherent home node, in which case the slave elements would be of the type used to connect to a non-coherent home node. Irrespective of whether the home node is fully coherent or not, the techniques described herein can improve overall system bandwidth utilisation when multiple slave elements used to access memory of different types are connected to the same home node.

Whilst the technique described herein can be employed in respect of various types of interconnect, for the purpose of the following discussion it will be assumed that the interconnect 30 uses the Advanced Microcontroller Bus Architecture (AMBA) developed by Arm Limited, Cambridge, United Kingdom, and in particular uses the AMBA 5 CHI (Coherent Hub Interface) Architecture Specification. In accordance with that specification, the fully coherent requester elements are referred to as RN-Fs (fully coherent request nodes) and the fully coherent home nodes are referred to as HN-Fs (fully coherent home nodes). The I/O coherent requester elements are referred to as RN-Is (I/O coherent request nodes) in accordance with the above specification, and such request nodes are arranged to only generate a subset of transactions defined by the interconnect protocol, and do not require snoop functionality. Similarly, the non-coherent home nodes are referred to in the AMBA 5 CHI Architecture Specification as HN-Is. Such a home node may be arranged to process a limited subset of the transactions defined by the protocol and, whilst acting as a point of serialisation, does not provide a point of coherence and is not capable of processing a snoopable request. Similarly, the slave elements (also referred to as slave nodes) connected to coherent home nodes are referred to as SN-Fs, whilst the slave elements connected to non-coherent home nodes are referred to as SN-Is.

In the example shown in FIG. 1, an I/O coherent requester 55 can be considered to be part of the interconnect, and is connected via an external link to an upstream master device, such as the I/O master device 20. Whilst the interconnect 30 may operate in accordance with the above described CHI Architecture Specification, and any connected fully coherent requester 10, 15 may be connected using a CHI link a shown in FIG. 1, a master device such as the I/O master device 20 may typically use a different communication protocol, and will be connected to the I/O coherent requester 55 via a link using that other protocol. In the example shown in FIG. 1, it is assumed that the I/O master element 20 uses the AMBA AXI Protocol Specification developed by Arm Limited, Cambridge, United Kingdom, and is connected to the interconnect 30 via an AXI link.

The routing of access requests through the interconnect is performed under the control of a System Address Map (SAM) component, and a SAM may be provided in association with each requester element. As shown in FIG. 1, for a fully coherent requester such as the requesters 10, 15, the associated SAM 40, 50 may be provided within the interface 35, 45 provided by the interconnect 30 for that requester element, whilst for an I/O coherent requester such as the requester element 55, the associated SAM 60 may be provided as part of that requester element in one example implementation.

For each requester element, the associated SAM is used to convert a memory address specified by an access request issued by that requester element into a target identifier indicating a completer element to which the access request is to be routed via a communication channel. In the example shown in FIG. 1, access requests destined for one of the slave elements 75, 85, 95 will be routed via the intermediate elements 65, and accordingly for such addresses the SAM associated with the requester element will identify the intermediate element 65 as the completer element. That intermediate element (home node) will then handle the received access request, and if necessary propagate the access request on to the required slave element. For this secondary communication, the home node may be viewed as the requester and the slave element as the completer, and as shown in FIG. 1 the home node 65 may include its own SAM 74 for determining the appropriate slave element to which an access request should be propagated.

When using the approach such as shown in FIG. 1, it will be appreciated that access requests targeting any of the slave elements 75, 85, 95 will be propagated through the home node 65. The home node 65 has tracking circuitry 69 that is used to track the handling of all of the pending memory access requests that are accepted by the home node for handling. The tracking circuitry may need to keep track of those memory access requests until they have been completed, for example until an acknowledgement has been returned back to the requester element to confirm that the memory access has been actioned, which may also involve the returning of read data to the requester element for read access requests.

The tracking circuitry 69 will only be able to keep track of a finite number of memory access requests. Accordingly, in situations where a new memory access request is received from one of the requester elements 10, 15, 55, but the tracking circuitry resources are already fully utilised tracking existing pending memory access requests, the new memory access request may need to be rejected. Retry management circuitry 70 may then be used to invoke a retry mechanism in respect of that newly received memory access request. In particular, that newly received memory access request will effectively be rejected, and the requester element informed accordingly. However, a retry mechanism will be used to enable that memory access request to be retried at a later point in time. The retry mechanism can take a variety of forms, but could for example involve the requester element periodically retrying the memory access request, or performing some polling operation in order to determine when the home node 65 may be available to receive the memory access request. Alternatively, the requester element may be arranged to merely wait until it subsequently receives a static grant signal from the home node 65 identifying that there is an available space in the tracking circuitry resources 69 to receive the retried memory access request.

However, situations can arise where such an approach can cause available bandwidth within the system to go unutilised. For instance, it may be that the various memory devices 80, 90, 97 operate at different speeds, and accordingly may have different bandwidth capabilities for processing memory access requests. This in turn will affect the bandwidth with which the slave elements 75, 85, 95 associated with those memory devices may process memory access requests received from the home node 65. Herein, such slave elements that are connected to associated memory devices will be referred to as memory controllers, and it will be appreciated that when those memory controllers are associated with different memory devices, the speed at which the individual memory controllers can process memory access requests may vary. In particular, a memory controller connected to a relatively high speed memory device will typically be able to process more access requests in a particular period of time than a memory controller connected to a slower memory device.

Without use of the techniques described herein, situations could readily arise where the tracking circuitry 69 becomes fully utilised and is hence unable for a period of time to accept new memory access requests irrespective of which memory device is targeted by those memory access requests. It may hence be the case, for example, that a newly received memory access request is targeting a relatively high speed memory device whose associated memory controller may have capacity to handle that memory access request, but nonetheless that memory access request may be subjected to the retry mechanism due to the tracking circuitry 69 being fully utilised handling existing memory access requests. There is hence the possibility that the memory access requests targeting relatively slow memory can use a disproportionately large amount of the tracking circuitry resources, and in effect block the efficient handling of other memory access requests targeting faster memory devices. This can lead to inefficient utilisation of the overall available bandwidth, reducing system performance and memory efficiency.

In accordance with the techniques described herein, this problem is alleviated through the use of request acceptance management circuitry 67 provided as part of the home node 65, as shown in FIG. 1. In particular, the request acceptance management circuitry 67 is arranged so that, in response to receipt by the home node 65 of a new memory access request, the request acceptance management circuitry identifies a target slave element amongst the plurality of slave elements 75, 85, 95 for that memory access request, and then determines whether to accept that memory access request dependent on an indication of bandwidth capability for the target slave element. By such an approach, it is able to ensure a certain proportion of the tracking circuitry resources are kept available for the handling of access requests targeting faster memory devices, so as to seek to make more efficient use of the overall memory bandwidth.

There are various ways in which the request acceptance management circuitry 67 can be arranged to obtain an indication of bandwidth capability for the various slave elements, and these will be discussed in more detail later. However, in summary, the slave elements themselves may be able to provide information signals on an ongoing basis, indicative of their available bandwidth for handling memory access requests. Such information signals could for example take the form of busyness signals (referred to in FIG. 1 as CBUSY signals) that provide an indication of a level of busyness of each slave element. Storage 72 may be used by the request acceptance management circuitry 67 to keep track of the busyness signals received from each of the slave elements over a period of time, for example by maintaining an average level of busyness for each slave element over a chosen preceding period of time. This enables a dynamic partitioning of the available resources in the tracking circuitry 69 amongst the different slave elements, taking into account the relative levels of busyness of those slave elements. Hence, by way of example, if the level of busyness of a particular slave element exceeds a given threshold, the request acceptance management circuitry may be arranged to reject subsequent access requests targeting that slave element until such time as the level of busyness of that slave element drops below the threshold.

As another example of information that can be used by the request acceptance management circuitry 67 to obtain an indication of bandwidth capability, quality of service (QoS) signals may be received by the home node 65 in association with each new memory access request. For each of the possible QoS levels, the request acceptance management circuitry may have an associated threshold defined identifying the number of entries within the tracking circuitry 69 that can be used simultaneously to track memory access requests with that QoS level. Hence, by way of example, a larger proportion of the tracking circuitry resources may be useable by memory access requests having a relatively high QoS level, as compared with the proportion of the tracking circuitry resources that can be used by memory access requests having a lower QoS level. Further, the QoS levels can be chosen having regard to the memory types of the memory devices associated with the various slave elements, so that for example higher QoS levels are associated with faster memory devices.

As another example approach that can be taken for providing the request acceptance management circuitry 67 with an indication of bandwidth capability for a target slave element, the SAM 74 within the home node 65 may be supplemented to provide one or more slave element attributes for each of the slave elements. Hence, when the SAM 74 is referred to in order to determine the target slave element for a newly received memory access request, such slave element attributes can also be retrieved and then used to decide whether to accept the memory access request or not. As an example of a slave element attribute that may be maintained within the SAM, a static bandwidth indicating value may be provided for each slave element, indicative of the bandwidth capabilities of that slave element. Different thresholds may then be defined for each static bandwidth indicating value to identify the number of entries within the tracking circuitry 69 that can be used simultaneously to track memory access requests whose target slave element has that static bandwidth indicating value. As with the QoS-based mechanism described earlier, this can enable the proportion of entries that can be used for memory access requests targeting relatively fast memory to be higher than the proportion of entries within the tracking circuitry that can be used for memory access requests targeting slower memory, thereby reducing the likelihood that the tracking circuitry resources can become fully utilised in the handling of access requests to slow memory devices and thus impact on performance by delaying the handling of memory access requests targeting faster memory devices.

Figure 2:
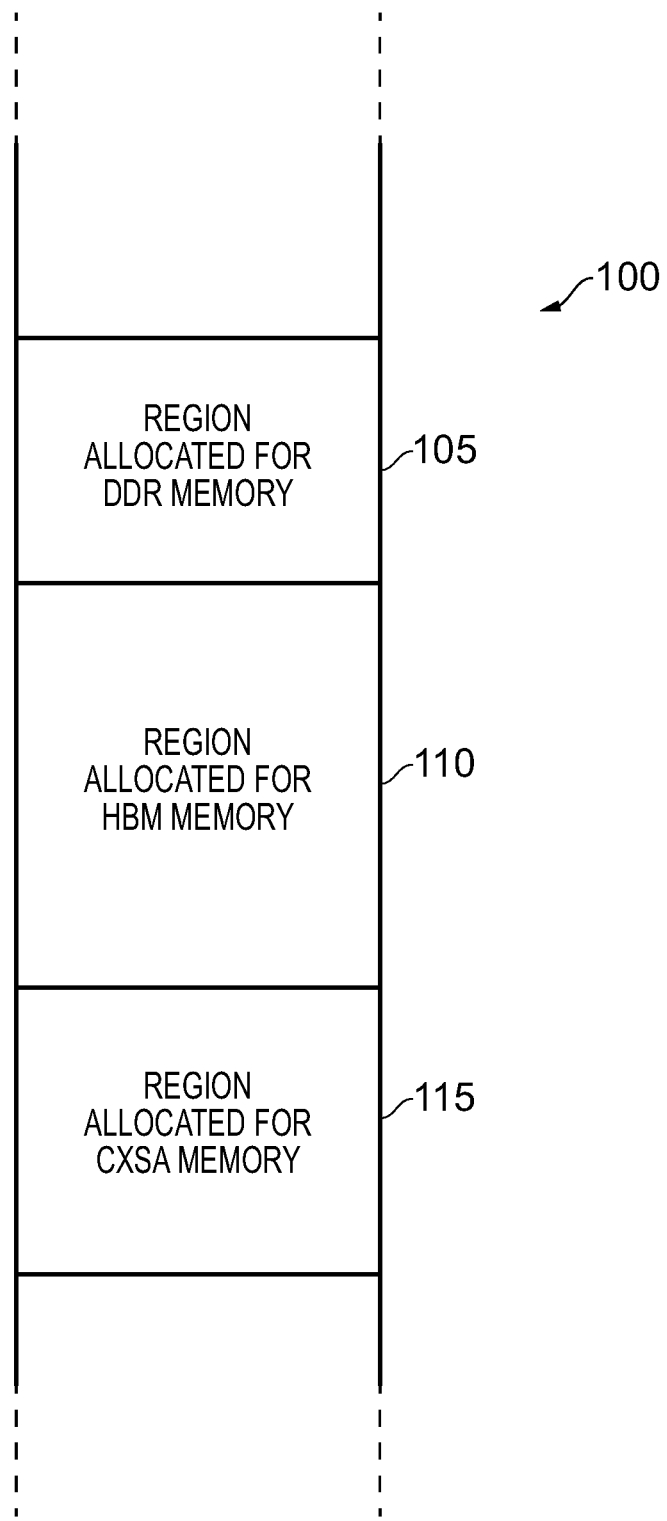
FIG. 2 schematically illustrates how a memory address space may be partitioned into different regions associated with different types of memory, in accordance with one example arrangement.

FIG. 2 schematically illustrates how the memory address space 100 may be considered to consist of plurality of regions 105, 110, 115. The regions may be allocated to different memory devices within the system, and hence for example region 105 may be associated with DDR memory 80, region 110 may be associated with HBM memory 90, region 115 may be associated with the off-chip memory 97, etc.

It will be appreciated that multiple regions may be allocated to a particular memory device, and those regions do not necessarily need to occupy contiguous addresses within the memory address space. Hence, purely by way of example, a first region of memory, and one or more further regions of memory non-contiguous with that first region, may collectively be allocated as the memory address space for DDR memory 80. Using the SAM mechanism discussed earlier, when a memory address is specified by a requester element in association with a memory access request, a determination can be made as to which region of the memory address space that address falls within, and hence which memory device that address maps to. This can be used to determine which home node 65 will receive the request, and in due course which slave element will be contacted to process the memory access request if the home node cannot directly process that memory access request (for example with reference to a cached copy of the data).

Figure 3:
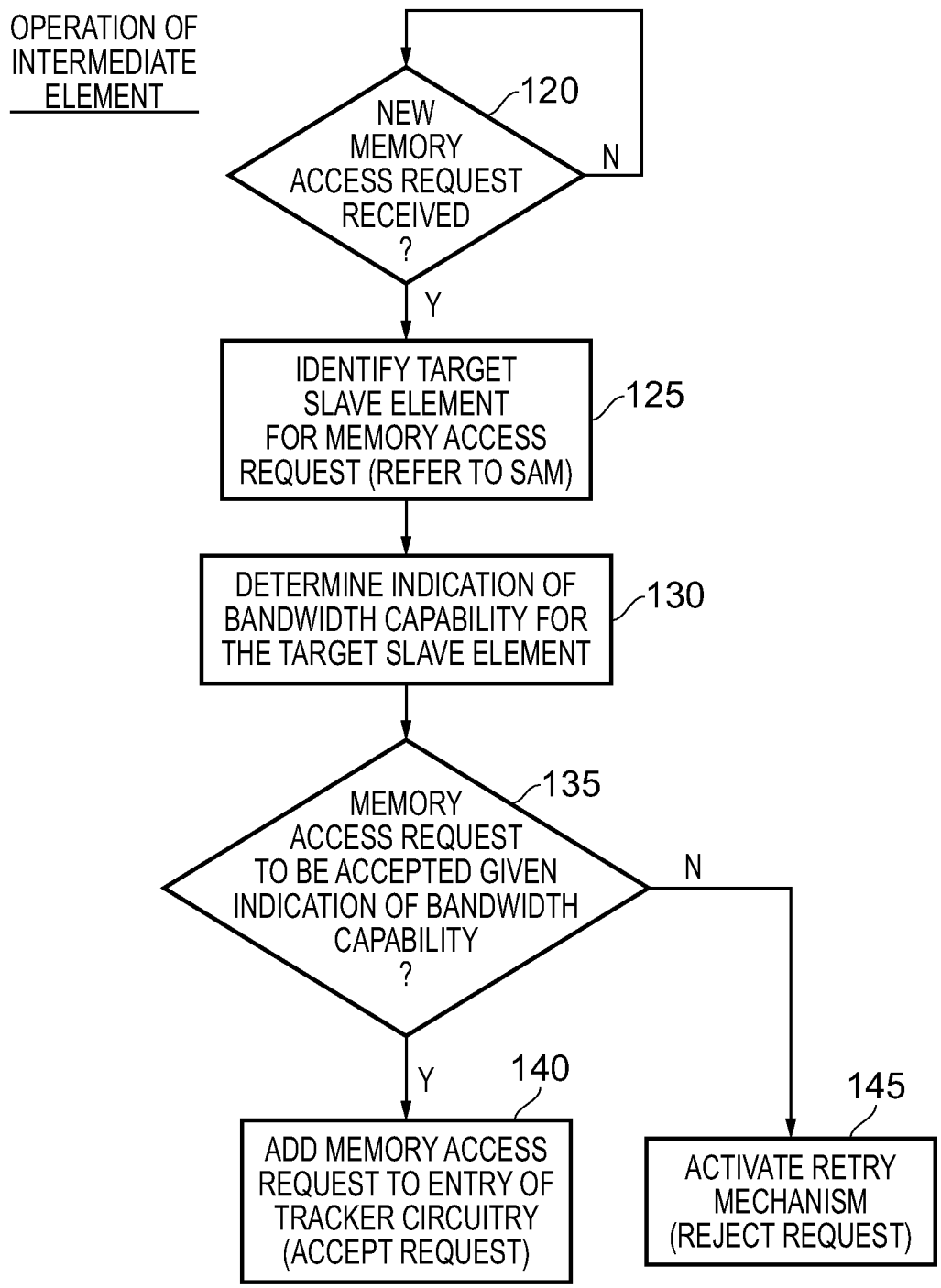
FIG. 3 is a flow diagram illustrating the operation of the intermediate element of FIG. 1 in accordance with one example arrangement.

FIG. 3 is a flow diagram illustrating the operation of the home node 65 of FIG. 1 (and in particular the request acceptance management circuitry 67 provided therein) in accordance with one example implementation, upon receipt of a new memory access request. At step 120, it is determined whether a new memory access request has been received from one of the requester elements 10, 15, 55, and if so the process proceeds to step 125 where the target slave element for that memory access request is identified. As discussed earlier, this process will typically involve reference to the SAM 74 within the home node 65.

In addition, an indication of bandwidth capability for the target slave element is then determined at step 130, and as discussed earlier there may be a number of mechanisms used to make this determination, for example with reference to the CBUSY signals received from the slave elements, with reference to a QoS signal provided in association with the memory access request, or with reference to a static bandwidth indicating value obtained from the SAM 74 when identifying the target slave element at step 125.

At step 135 it is then determined whether the memory access request is to be accepted given the indication of the bandwidth capability for the target slave element. If not, then the retry management circuitry 70 is used to activate a retry mechanism at step 145, at this point the request effectively being rejected and needing to be retried at a later point by the requester element. However, if it determined at step 135 that the memory access request is to be accepted, then that memory access request is added to an available entry of the tracker circuitry 69 at step 140, and thereafter is processed in the normal manner. In one example implementation, the above described steps of FIG. 3 may be performed by the request acceptance management circuitry 67 of the home node 65, with the request acceptance management circuitry either liaising with the tracking circuitry 69 at step 140 to cause an entry within the tracker circuitry to be allocated for the memory access request, or liaising with the retry management circuitry 70 at step 145 in order to cause the retry mechanism to be activated.

Figure 4A:
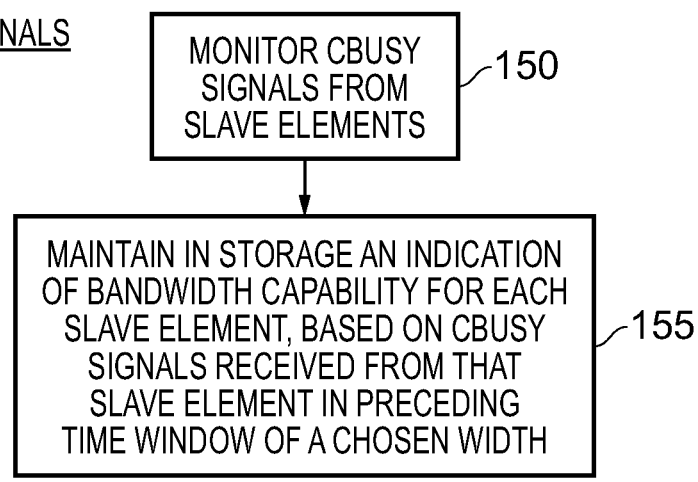
FIGS. 4A and 4B are flow diagrams illustrating how busyness signals provided to the intermediate element from the various slave elements may be used by the intermediate element when deciding whether to accept a newly received memory access request, in accordance with one example arrangement.

FIG. 4A illustrates how the CBUSY signals provided by the slave elements 75, 85, 95 may be used by the home node 65 in one example implementation. At step 150, the CBUSY signals are monitored from the various slave elements, and at step 155 an indication of bandwidth capability for each slave element is calculated in dependence on the received CBUSY signals, and maintained within the storage 72 for later reference by the request acceptance management circuitry when considering new memory access requests. Whilst the storage could in one example arrangement be merely used to maintain the latest CBUSY indication from each slave element, in one example implementation the CBUSY signals received over a period of time are averaged in order to provide an indication of busyness of each memory device within a preceding time window of a chosen width.

Figure 4B:
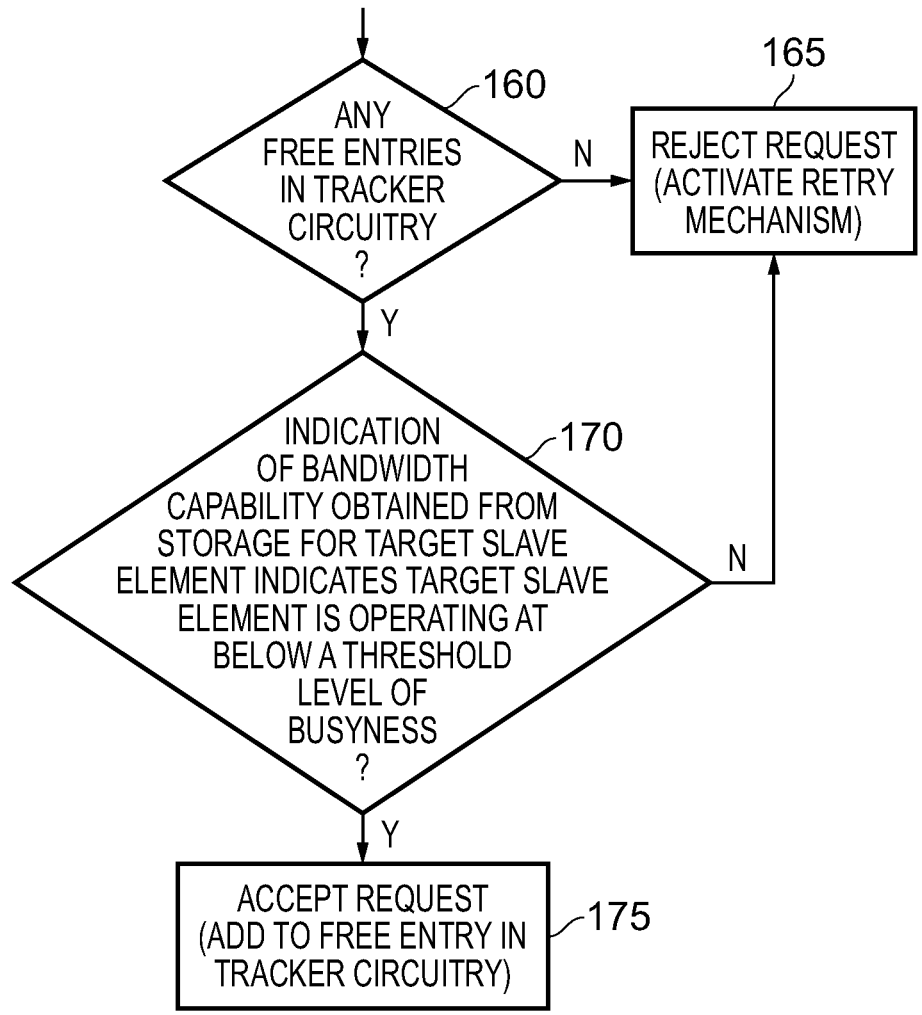

FIG. 4B is a flow diagram illustrating how the decision made at step 135 of FIG. 3 may be implemented when using the CBUSY information maintained using the approach of FIG. 4A. At step 160, it is determined whether there are any free entries in the tracker circuitry 69, and if not the request is rejected at step 165 by activating the retry mechanism. However, assuming there is at least one free entry in the tracker circuitry, the process proceeds to step 170 where it is determined whether the indication of bandwidth capability obtained from the storage 72 for the target slave element indicates that the target slave element is operating at a below a threshold level of busyness. If not, then again the request is rejected at step 165, but otherwise the request is accepted at step 175, with an entry within the tracking circuitry then being allocated for holding the details of the memory access request. When using the techniques described herein, this has been found to significantly reduce the chance of there not being any free entries in the tracker circuitry, and hence can increase the overall system performance by making better utilisation of the bandwidth capabilities of the various memory devices.

By using the CBUSY indications discussed above, this enables the dynamic partitioning of the available resources of the tracking circuitry taking into account the relative levels of busyness of the various slave elements. Once a slave element starts to exhibit a level of busyness above a certain threshold, then the request acceptance management circuitry can temporarily reject subsequent memory access requests targeting that slave element, so that those memory access requests can then be retried once that slave element's level of busyness has reduced. This hence keeps space available within the tracking circuitry for memory access requests identifying other slave elements that may be less busy, and hence may be in a better position to handle further access requests.

As an alternative to using the CBUSY signals to provide an indication of bandwidth capability, or in addition thereto, the home node 65 may be provided with QoS signals in association with each new memory access request. In particular, such QoS information may be added in association with each new memory access request, based on information retrieved from the SAM 40, 50, 60 associated with the requester element 10, 15, 55 issuing that memory access request.

Figures 5A, 5B:
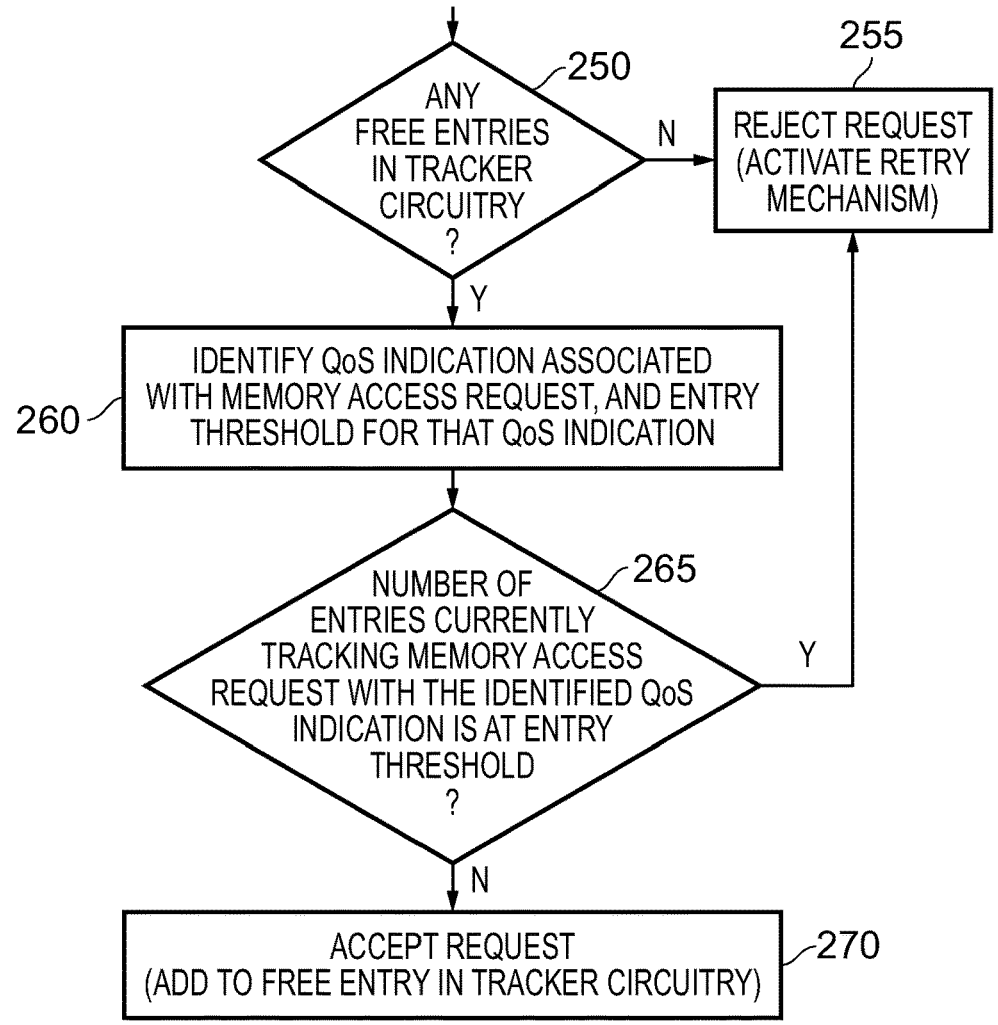
FIG. 5A illustrates the form of a system address map that may be provided in association with each requester element in one example arrangement.
FIG. 5B is a flow diagram illustrating how quality of service information provided in association with a memory access request may be used by the intermediate element to determine whether to accept that memory access request, in accordance with one example arrangement.

FIG. 5A is a diagram schematically illustrating information that may be provided within the system address map 40, 50, 60 for each requester element 10, 15, 55. The SAM 200 includes a number of entries 205, and each entry provides a number of fields 210, 215, 220. The field 210 is used to identify an address range, and the information in the field 210 of the various entries 205 can be used to identify various different programmable regions within the memory address space. In one example implementation, the partitioning of the address space is not necessarily static, and hence at different points in time different address ranges may be defined within the entries 205.

For an address range identified within the field 210 of a particular entry 205, a corresponding field 215 may be used to specify a target identifier (target ID) used to indicate the completer element that is to be used for accesses within that address range. For the accesses targeting addresses within the memory devices 80, 90, 97 shown in FIG. 1, it is assumed that those accesses are routed via the home node 65, and hence the completer element identified by the target ID will be the home node 65. This hence ensures that all such access requests are propagated from the interfaces 35, 45 or the requester element 55 through the communication channels of the interconnect to the home node 65, for subsequent handling.

As shown in FIG. 5A, a third field 220 may be used to specify a memory type of the memory device associated with the address region in the field 210. This memory type information can then be used to determine a suitable QoS value for the memory access request, for example by associating higher QoS values with memory types that relate to faster memory. Whilst the determination of the QoS level can be performed based on the memory type information obtained from the field 220, if desired the actual QoS value can be populated within the memory type field 220 so that the QoS value is directly obtained from the lookup within the SAM 40, 50, 60.

FIG. 5B illustrates a process that can be performed by the request acceptance management circuitry 67 in order to determine whether to accept a newly received memory access request, based on the specified QoS value for that memory access request. At step 250 it is determined whether there are any free entries in the tracker circuitry 69, and if not the request is rejected at step 255. As discussed earlier, this will typically involve activating the retry mechanism using the retry management circuitry 70.

Assuming there is at least one free entry in the tracker circuitry, then the process proceeds to step 260 where the QoS indication (also referred to herein as the QoS value) associated with the memory access request is identified. Further, the home node 65 can be arranged to maintain entry thresholds for each possible QoS value, for example by storing such information within the storage 72. Hence, at step 260, in addition to identifying the QoS value associated with the memory access request, the entry threshold for that QoS value is also obtained. This identifies the maximum number of entries that may be used within the tracking circuitry at any point in time to handle access requests of that chosen QoS value.

Accordingly, at step 265 it is determined whether the number of entries currently tracking memory access requests with the identified QoS value is at the entry threshold or not. If so, then the request is rejected at step 255, whereas otherwise it is accepted at step 270, and information pertaining to that memory access request is then added to a free entry within the tracking circuitry 69. It will be appreciated that such an approach provides for a static partitioning of the available tracking circuitry resources, by associating different QoS levels with different types of memory device, and controlling the occupancy levels allowed within the tracking circuitry for memory access requests having different QoS levels. By such an approach, it is possible to restrict the number of entries within the tracking circuitry that can be used for accesses to particular types of memory device, and therefore, for example, avoid the available resources of the tracking circuitry being disproportionately used for memory accesses to relatively slow memory, which could inhibit effective utilisation of the bandwidth available for handling accesses to faster memory devices.

Figures 6A, 6B:
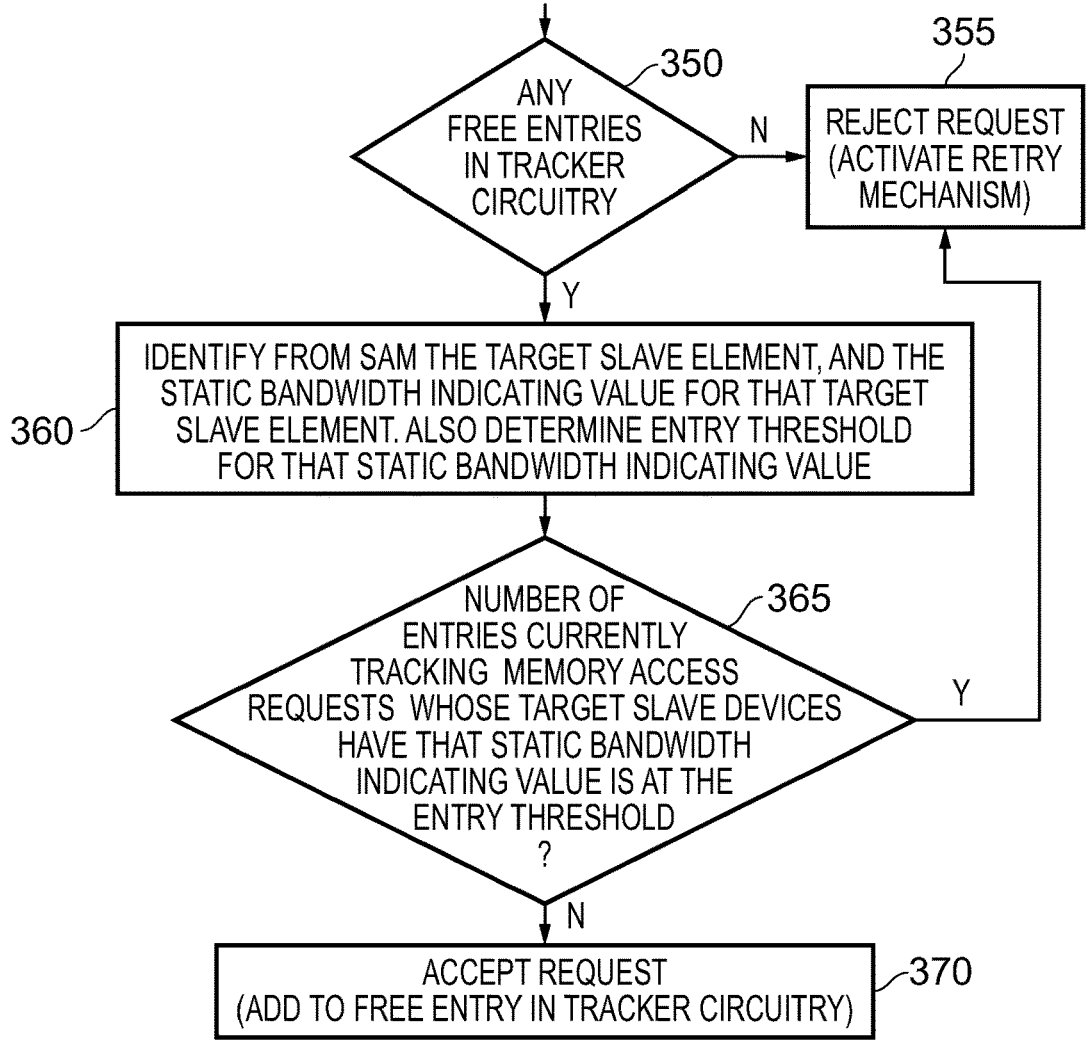
FIG. 6A illustrates a form of system address map that may be provided in association with the intermediate element in one example arrangement.
FIG. 6B is a flow diagram illustrating how static bandwidth information obtained from a system address map such as shown in FIG. 6A may be used by the intermediate element when deciding whether to accept a memory access request, in accordance with one example arrangement.

As an alternative to the approaches described above, or in addition thereto, the request acceptance management circuitry 67 may also have use of a further source of information when deciding whether to accept or reject a newly received memory access request. In particular, as shown in FIG. 6A, the SAM 74 associated with the home node 65 may be modified to provide additional information indicative of bandwidth capability of different slave elements. In particular, the SAM 300 may include multiple entries 305, where each entry provides a number of fields 310, 315, 320. Field 310 can be used to specify a programmable address range, and for any specified address range in the field 310, the corresponding field 315 may provide a target identifier used to indicate the slave element to be used for any access to that address range. This enables the home node 65 to determine which of the slave elements 75, 85, 95 need to be communicated with in situations where the memory access request needs to be propagated on to those slave elements for handling. It should be noted that it is not always the case that a memory access request needs to be propagated on to the slave element, since it may be the case that the home node can service the memory access request directly. For instance, as discussed earlier, various of the requester elements may include local caching structures, and it may be that the data requested by a particular memory access request is available from one of those cache structures, in which case the home node may be able to obtain the data directly and return it to the requesting element without needing to access the slave element. However, in situations where the slave element does need to be accessed, then the information in the field 315 will identify which slave element to contact.

In addition, the field 320 can provide one or more slave element attributes associated with the slave element identified by the target identifier in field 315. The slave element attributes can take a variety of forms, but in one example implementation may provide a static bandwidth indicating value, which itself may be determined based on knowledge of the type of memory device associated with the slave element, and hence for example the speed with which accesses can be performed within that memory device. In accordance with this approach, the bandwidth indicating value is static in the sense that it is dictated by the type of memory device associated with the slave element, and hence a higher bandwidth indicating value can be provided for a slave element that is associated with a relatively high speed memory device, compared with a slave element that is associated with a relatively low speed memory device.

FIG. 6B illustrates the steps that may be performed when determining whether to accept a memory access request based on such static bandwidth indicating value information. At step 350 it is determined whether there are any free entries in the tracker circuitry 69, and if not the request is rejected at step 355. However, assuming there is at least one free entry, then at step 360 the SAM 74, 300 is referenced in order to determine the target slave element, and the static bandwidth indicating value for that target slave element. In addition, entry threshold information is obtained for that static bandwidth indicating value. In much the same way as discussed earlier for the QoS value, the request acceptance management circuitry may maintain separate entry thresholds for the various different possible static bandwidth indicating values, for example by maintaining that information within the storage 72, and hence once the static bandwidth indicating value has been obtained from the SAM for the access request in question, the corresponding entry threshold can also be retrieved.

It is then determined at step 365 whether the number of entries currently tracking memory access requests whose target slave devices have that static bandwidth indicating value is already at the entry threshold level. If it is, then the request is rejected at step 355, whereas otherwise it is accepted at step 370, and accordingly at that point one of the free entries within the tracker circuitry is allocated for storing the information about the newly received memory access request. In much the same way as the earlier-discussed QoS mechanism, it will be appreciated that such a mechanism allows for a static partitioning of the resources of the tracking circuitry dependent on the type of memory devices being accessed, so as to seek to ensure that accesses to slower memory devices cannot disproportionately utilise the resources of the tracking circuitry, and thus seek to ensure that tracking circuitry resources are kept available for accesses to higher speed memory devices.

Figure 7:
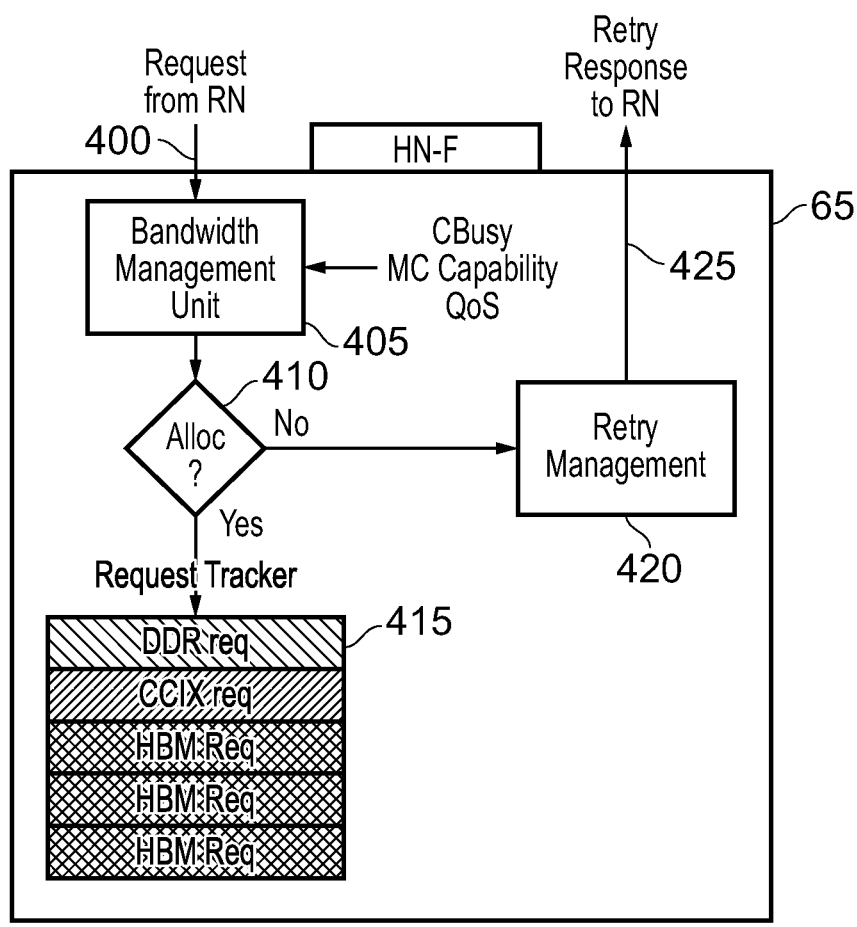
FIG. 7 schematically illustrates the operation of the intermediate element in accordance with one example arrangement.

FIG. 7 schematically illustrates the above described process that may be used within home node 65. When a request is received from a requester element over path 400, the bandwidth management unit (BMU) 405 (which may take the form of the request acceptance management circuitry 67 discussed earlier) can be used to determine whether to accept or reject that request based on certain information that can be used to derive an indication of the bandwidth capability for the target slave element associated with that request. As discussed earlier, CBUSY signals received from the various slave elements can be used, whilst alternatively, or in addition, QoS information provided with the memory access request can also be used for this purpose. Further, slave element attributes obtained from the SAM 74 (referred to in FIG. 7 as MC (memory controller) capability information) can alternatively, or in addition, be used to provide an indication of bandwidth capability of the target slave element.

Based on the analysis of the bandwidth management unit 405, it is determined whether an entry should be allocated within the request tracker for the current memory access request or not. If so, then a free entry is allocated within the tracker 415 to store the latest memory access request. As illustrated schematically in FIG. 7, at any point in time the request tracker circuitry may keep track of requests targeting a variety of different types of memory, and when using the techniques described herein the tracking circuitry resources can be managed so as to ensure a suitable proportion of the resources are available for accesses to high speed memory, such as the HBM memory referred to earlier.

If it is determined that the newly received request should not be accepted, then a retry management process 420 is invoked, resulting in the issue of a retry response to the requester element over path 425.

FIG. 8A illustrates an example system 500 consisting of a plurality of requester elements 505, 510, 515, which issue access requests seeking to access a variety of different slave elements 530, 535, 540 via a home node 525 within interconnect 520. In this example, it is assumed that the slave element 530 is associated with DDR memory, the slave element 535 is associated with HBM memory, and the slave element 540 is a CXSA slave element associated with an off-chip memory 545 that is communicated with via a CCIX link. Each of the slave elements 530, 535, 540 may maintain their own local queues 532, 537, 542 to keep track of the memory access requests currently being handled by those slave elements. Further, within the home node 525, the tracking circuitry may include a shared queue 526 that keeps track of all of the pending access requests that it has accepted for handling. This may include not only the pending access requests that it has accepted but not yet issued to the slave elements, but also the pending access requests that it has issued to the slave elements but which have not yet been fully processed by those slave elements.

In this example, it is assumed that the off-chip memory 545 is the slowest to be accessed, that the DDR memory accessed by the slave element 530 has an intermediate speed of access, and that the HBM memory accessed by the slave element 535 has the fastest access speed. Whilst FIG. 8A (and indeed FIG. 8B discussed later) show the access requests for each slave element being issued by different requester elements, this is just for ease of illustration, and it should be noted that in one example implementation each requester element 505, 510, 515 is capable of targeting any of the memory devices, and hence can issue access requests for routing to any of the slave elements 530, 535, 540.

FIG. 8A illustrates the potential problem that can arise during busy periods of time, in particular where significant numbers of accesses are targeting the relatively slow memory devices, in situations where the techniques described herein are not employed. In particular, a large proportion of the available space within the shared queue 526 of the tracking circuitry within the home node 525 may be occupied by memory access requests targeting the slower memory devices, leaving little space to accept access requests pertaining to faster memory devices. As such, whilst the slave elements 530, 540 associated with the slower memory devices may be relatively fully utilised, the slave element 535 may be only lightly utilised, and have a significant amount of spare capacity within its own local queue 537. Hence, the available bandwidth for accessing HBM memory is in this case not being fully utilised, and as a result the overall system performance may be reduced.

Figure 8B:
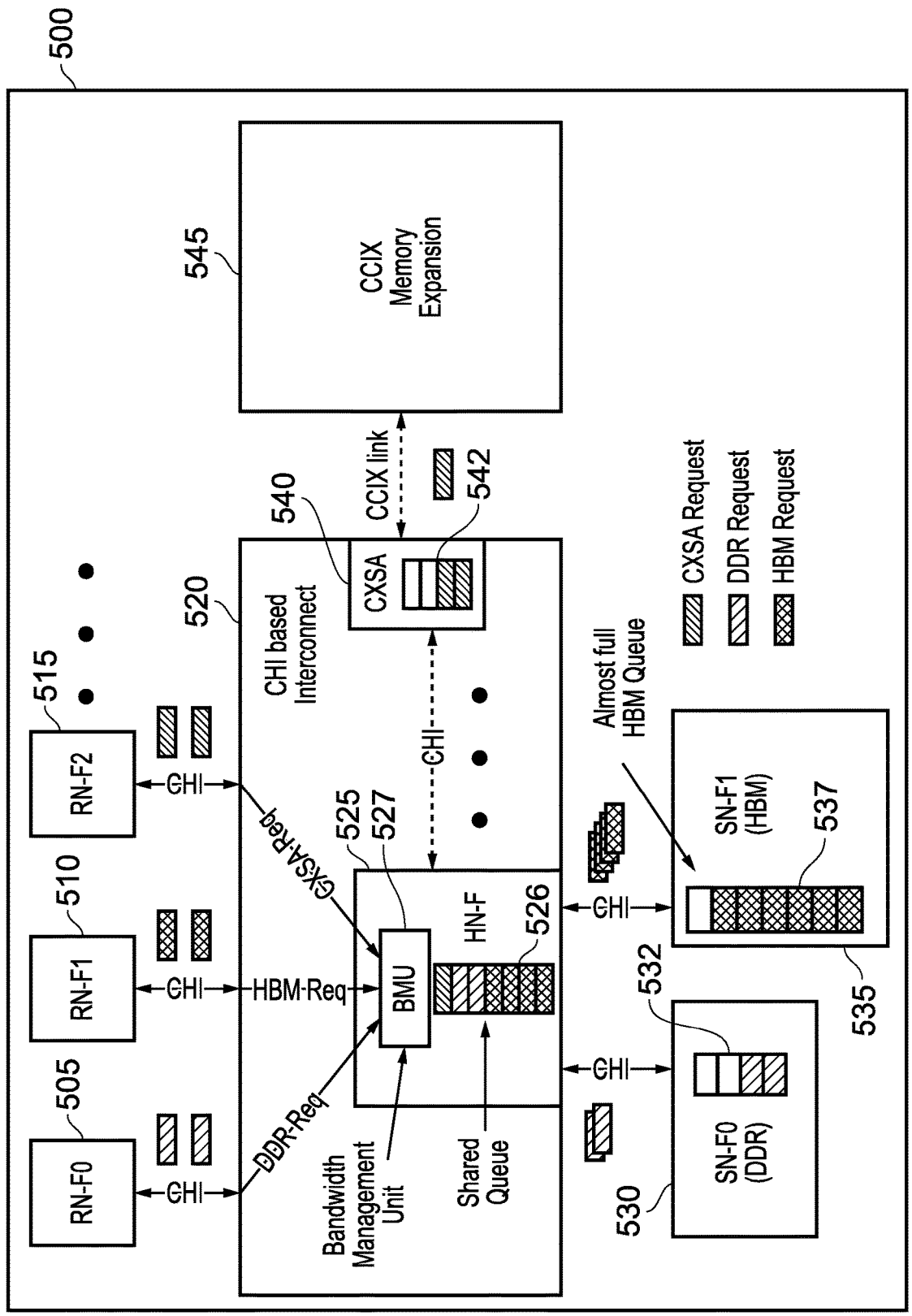
FIG. 8B illustrates, by way of specific example, how the use of the techniques described herein can allow for improved overall system bandwidth management.

FIG. 8B illustrates the same example system, but where the home node 525 includes the earlier discussed bandwidth management unit 527, and hence is able to proactively decide which memory access request to accept, taking into account the bandwidth capabilities of the slave elements being targeted by those memory access requests. As a result, the techniques described herein may avoid the shared queue 526 being disproportionately occupied by accesses to slower memory devices, and instead can allow for a more efficient utilisation of the overall memory access resources of the system. In particular, as shown, the local queues 532, 542 within the slave elements 530, 540 may no longer be fully utilised, but by adopting the adaptive partitioning scheme described herein, a much better utilisation of the queue 537 associated with the fast memory device can be achieved. Such an approach allows for a much more efficient use of the memory bandwidth available within the system in situations where a home node communicates with memory controllers associated with different types of memory devices, thereby improving the overall system performance.

It will be appreciated from the above description that the techniques described herein alleviate the chances of traffic to slower memory controllers overwhelming the shared resources in the interconnect, and hence reducing the likelihood of faster memory throughput not being fully utilised. In accordance with the techniques described herein, the shared resources at the home node can be dynamically partitioned based on the performance capabilities of the targeted end points, in order to improve the overall system performance and memory efficiency.

By using the techniques described herein, then in the presence of memory controllers with varying bandwidth capabilities, those techniques can be used to seek to maximise the overall system bandwidth. As shown by way of example with reference to FIG. 8B, the bandwidth management unit can control the allocation of access requests to the shared tracker queue at the home node such that the shared tracker is mostly occupied with transactions targeting faster memory controllers such as the HBM controller, while transactions targeting slower memory controllers get reduced occupancy. This can result in a more optimum utilisation of the resources within the HBM memory controller, which in turn can improve the overall system performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    an interconnect configured to couple a plurality of requester elements with a plurality of slave elements, the plurality of requester elements being arranged to issue memory access requests for processing by the plurality of slave elements; and
    an intermediate element provided within the interconnect and configured to act as a point of serialisation to order the memory access requests issued by the plurality of requester elements via the intermediate element;
    the intermediate element comprising tracking circuitry shared between the plurality of slave elements and having a plurality of entries and configured to track handling of the memory access requests accepted by the intermediate element;
    the intermediate element comprising address mapping circuitry configured to map specified address ranges to a target identifier used to indicate a target slave element to be used for access to that address range and to information indicative of bandwidth capability for the target slave element;
    the intermediate element further comprising request acceptance management circuitry that, in response to receipt by the intermediate element of a given memory access request, is arranged to identify the target slave element amongst the plurality of slave elements for that given memory access request using the address mapping circuitry, and to determine whether the given memory access request is to be accepted by the intermediate element acting as the point of serialisation, by determining whether there is a free entry in the tracking circuitry usable for the given memory access request without causing an entry threshold to be exceeded, the entry threshold being dependent on the information indicative of bandwidth capability for the target slave element provided by the address mapping circuitry.

2. An apparatus as claimed in claim 1, further comprising: retry management circuitry arranged, when the request acceptance management circuitry indicates that the given memory access request is not to be accepted, to communicate with the requester element that issued the given memory access request in order to implement a retry mechanism for the given memory access request.

3. An apparatus as claimed in claim 1, wherein:
    each slave element has an associated memory device, and the information indicative of the bandwidth capability for that target slave element is dependent on the associated memory device.

4. An apparatus as claimed in claim 3, wherein the bandwidth capability for the target slave element is dependent on a memory type of the associated memory device.

5. An apparatus as claimed in claim 1, wherein the request acceptance management circuitry is arranged to determine whether the given memory access request is to be accepted by the intermediate element based on busyness signals issued by each slave element to identify a level of busyness of that slave element.

6. An apparatus as claimed in claim 5, wherein:
    the request acceptance management circuitry is arranged to determine that the given memory access request is to be accepted by the intermediate element when there is a free entry in the tracking circuitry usable for the given memory access request, and the busyness signal for the target slave element indicates that the target slave element is operating at below a given threshold level of busyness.

7. An apparatus as claimed in claim 1, wherein the request acceptance management circuitry is arranged to maintain the information indicative of bandwidth capability for each slave element in dependence on information signals received from that slave element over a preceding chosen period of time.

8. An apparatus as claimed in claim 1, further comprising:
    requester address mapping circuitry associated with each requester element to convert a memory address specified by a memory access request issued by that requester element into a target identifier used to route the memory access request through the interconnect, the requester address mapping circuitry providing memory type information for different memory address ranges, and the information indicative of bandwidth capability being determined based on the memory type information for the memory address range including the memory address specified by the memory access request.

9. An apparatus as claimed in claim 1, wherein the information indicative of bandwidth capability for the slave element provided by the address mapping circuitry comprises a bandwidth indicating value.

10. An apparatus as claimed in claim 9, wherein the bandwidth indicating value is dependent on a memory type of a memory device associated with the slave element.

11. An apparatus as claimed in claim 9, wherein:
the tracking circuitry has a plurality of entries for tracking memory access requests;
for each bandwidth indicating value the entry threshold is defined identifying the number of entries within the tracking circuitry that are able to be used simultaneously to track memory access requests whose target slave element has that bandwidth indicating value; and
the request acceptance management circuitry is arranged to determine that the given memory access request is to be rejected when, taking into account the entry threshold for the bandwidth indicating value of the target slave element for that given memory access request provided by the address mapping circuitry, there are no available entries within the tracking circuitry.

12. A method of handling memory access requests comprising:
providing an interconnect to couple a plurality of requester elements with a plurality of slave elements, the plurality of requester elements being arranged to issue the memory access requests for processing by the plurality of slave elements;
employing an intermediate element provided within the interconnect to act as a point of serialisation to order the memory access requests issued by the plurality of requester elements via the intermediate element;
tracking, within tracking circuitry of the intermediate element shared between the plurality of slave elements and having a plurality of entries, handling of the memory access requests accepted by the intermediate element;
mapping, within address mapping circuitry of the intermediate element, specified address ranges to a target identifier used to indicate a target slave element to be used for access to that address range and to information indicative of bandwidth capability for the target slave element; and
in response to receipt by the intermediate element of a given memory access request, identifying the target slave element amongst the plurality of slave elements for that given memory access request using the address mapping circuitry, and determining whether the given memory access request is to be accepted by the intermediate element acting as the point of serialization, by determining whether there is a free entry in the interconnect usable for the given memory access request without causing an entry threshold to be exceeded, the entry threshold being dependent on the information indicative of bandwidth capability for the target slave element provided by the address mapping circuitry.

* * * * *